(No Model.)

S. A. DONNELLY.
BICYCLE.

No. 448,509. Patented Mar. 17, 1891.

WITNESSES
A. J. Schwartz
J. C. Edwards

Samuel A. Donnelly
INVENTOR
By W. T. FitzGerald & Co.
Attorneys

UNITED STATES PATENT OFFICE.

SAMUEL A. DONNELLY, OF CHICAGO, ILLINOIS.

BICYCLE.

SPECIFICATION forming part of Letters Patent No. 448,509, dated March 17, 1891.

Application filed November 29, 1890. Serial No. 373,057. (No model.)

*To all whom it may concern:*

Be it known that I, SAMUEL A. DONNELLY, a citizen of the United States, residing at Chicago, in the county of Cook and State of Illinois, have invented certain new and useful Improvements in Bicycles; and I do hereby declare the following to be a full, clear, and exact description of the invention, such as will enable others skilled in the art to which it appertains to make and use the same.

My invention consists in certain new and useful improvements in bicycles, which will be hereinafter fully described and claimed.

Figure 1:
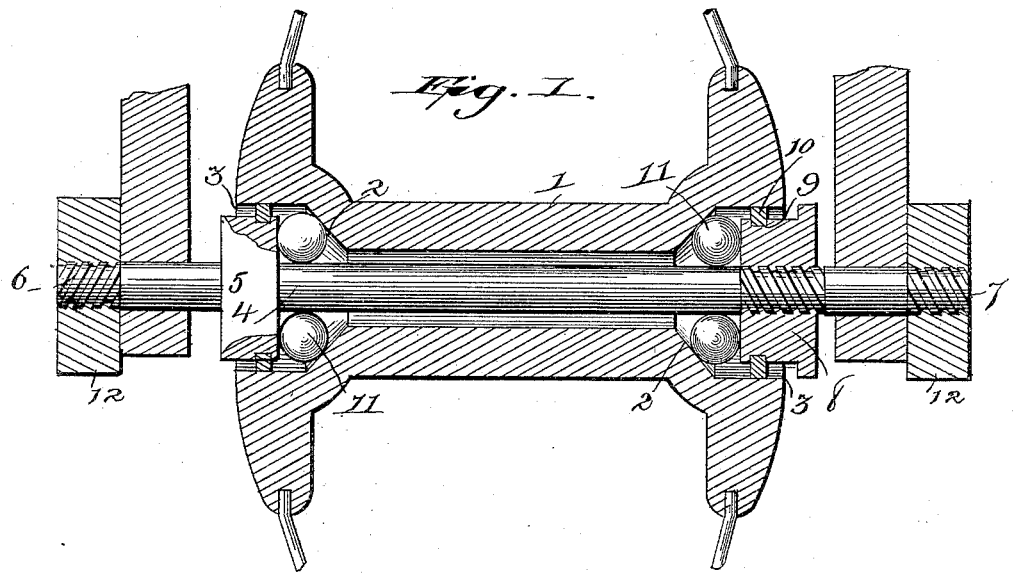
Figure 2:
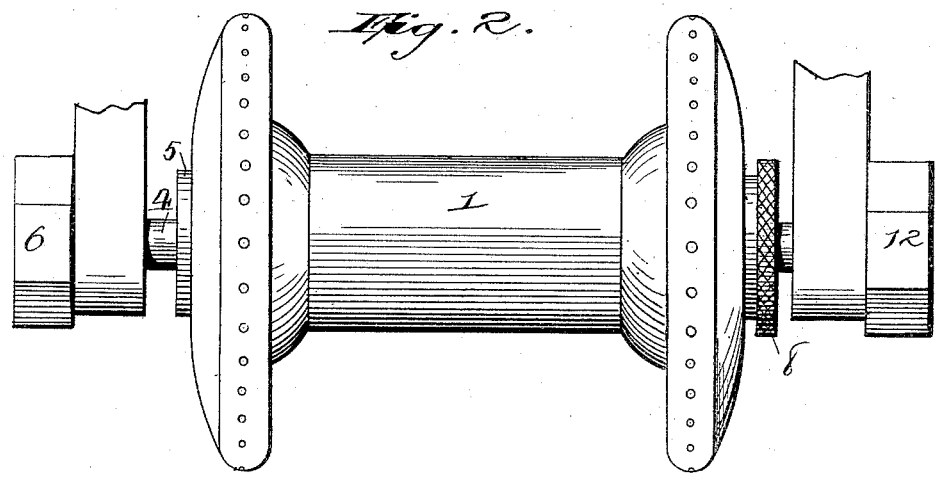

Referring to the accompanying drawings, Figure 1 is a longitudinal central sectional view of a wheel hub and axle provided with my anti-friction bearing. Fig. 2 is an elevation of the same.

The same numerals of reference indicate corresponding parts in all the figures.

Referring to the several parts by their designating numerals, 1 indicates the hub of a bicycle-wheel constructed according to my invention. This hub is formed at its ends with curved conical seats 2 and with the straight end bores 3 outside of the conical seats.

4 indicates my wheel-axle, which is formed near one end with the integral collar 5, while the end 6 of the axle, which projects outward beyond this collar, is threaded, and the other end 7 of the axle is likewise threaded. Upon the end 7 of the axle screws an adjustable round nut 8, the outer end of which has its edge enlarged and milled to afford a convenient grasp for the fingers in turning or adjusting the nut. The collar 5 and the nut 8 are formed each with an annular groove 9, in which a leather washer 10 is seated, as shown.

Anti-friction bearing-balls 11 are arranged between the conical seats 2, formed in the ends of the hub 1 and the collar 5 and nut 8, respectively, and it will be seen that any wear on the bearing parts can be readily and instantly taken up by turning the nut 8 on that threaded end of the axle, as will be readily understood. The leather washers 10 serve to effectually keep out all dust from the bearings, thus causing my new and improved anti-friction bearing to operate without clogging and without the necessity of taking it apart to clean the several parts.

The ends of the forks of the machine-frame fit on the outer ends of the axles, where they are secured by binding-nuts 12, which screw on the outer extremities of the axle ends.

Having thus described my invention, what I claim, and desire to secure by Letters Patent, is—

1. The combination of a wheel having its hub formed at its end with the conical seats 2, the axle provided near one end with the fixed collar 5, having the annular groove 9, and having the threaded ends 6 and 7, the adjusting-nut 8, formed with the annular groove, the annular washers fitting in the annular grooves of the collar 5 and the adjusting-nut, and the balls 11, substantially as set forth.

2. The combination of the wheel-hub formed at its ends with the conical seats 2 and the straight bores 3 on the outer side of said seats, the axle provided near one end with the fixed collar 5, having the annular groove 9, and having the threaded ends 6 and 7, the adjusting-nut 8, formed with the annular groove, the annular washers fitting in the annular grooves 9 of the collar 5 and the adjusting-nut, and the balls 11, substantially as set forth.

3. The combination of a wheel having its hub formed at its ends with the conical seats 2, the axle provided near one end with the fixed collar 5, having the annular groove 9, and having the threaded ends 6 and 7, the adjusting-nut 8, having the milled outer end and formed with the annular groove 9, the annular washers fitting in the annular grooves of the collar 5 and the adjusting-nut, the balls 11, and the outer binding-nuts 12, substantially as set forth.

In testimony whereof I affix my signature in presence of two witnesses.

SAMUEL A. DONNELLY.

Witnesses:
  M. DONNELLY,
  JOSEPH DONNELLY.